United States Patent
Hirst et al.

(10) Patent No.: US 9,319,912 B2
(45) Date of Patent: Apr. 19, 2016

(54) SYSTEM AND METHOD FOR CONCURRENTLY TESTING MULTIPLE PACKET DATA SIGNAL TRANSCEIVERS CAPABLE OF COMMUNICATING VIA MULTIPLE RADIO ACCESS TECHNOLOGIES

(71) Applicant: LITEPOINT CORPORATION, Sunnyvale, CA (US)

(72) Inventors: Jonathan Barry Hirst, Sunnyvale, CA (US); James L. Banzen, Inverness, IL (US); William L. Barker, Jr., Oak Lawn, IL (US)

(73) Assignee: LITEPOINT CORPORATION, Sunnyvale, CA (US)

( * ) Notice: Subject to any disclaimer, the term of this patent is extended or adjusted under 35 U.S.C. 154(b) by 193 days.

(21) Appl. No.: 14/146,257

(22) Filed: Jan. 2, 2014

(65) Prior Publication Data
US 2015/0189524 A1   Jul. 2, 2015

(51) Int. Cl.
H04W 4/00        (2009.01)
H04W 24/08       (2009.01)
H04L 12/721      (2013.01)
H04L 29/06       (2006.01)
H04B 17/00       (2015.01)

(52) U.S. Cl.
CPC ............ *H04W 24/08* (2013.01); *H04B 17/00* (2013.01); *H04L 45/70* (2013.01); *H04L 69/28* (2013.01)

(58) Field of Classification Search
CPC ........ H04W 24/08; H04L 45/70; H04L 69/28
USPC .................................................. 370/241, 252
See application file for complete search history.

(56) References Cited

U.S. PATENT DOCUMENTS

| | | | | |
|---|---|---|---|---|
| 6,480,481 B1* | 11/2002 | Park | ...................... | H04W 52/38 370/318 |
| 6,564,350 B1* | 5/2003 | Hoeweler | ........... | G01R 31/2822 343/703 |
| 6,747,983 B1* | 6/2004 | Knutson | .............. | H04N 21/235 348/E5.007 |
| 8,312,329 B1* | 11/2012 | Yellapantula | ............. | H04L 1/24 714/704 |

(Continued)

FOREIGN PATENT DOCUMENTS

WO   2009-135866 A1   11/2009
WO   2010-019087 A1   2/2010

(Continued)

OTHER PUBLICATIONS

International Search Report and Written Opinion for PCT/US2014/070490 dated Apr. 7, 2015, 9 pages.

(Continued)

*Primary Examiner* — Farah Faroul
(74) *Attorney, Agent, or Firm* — Vedder Price, P.C.

(57) ABSTRACT

System and method for using a shared packet data signal source to test multiple packet data signal transceiver devices under test (DUTs) capable of communicating using multiple radio access technologies (RATs). The signal source provides a packet data signal that includes a plurality of sequential signal segments having respective signal timing parameters and mutually distinct signal characteristics in accordance with the RATs. Based upon the signal timing parameters, at least a portion of each signal segment is routed to a respective one of multiple signal connections for conveyance to a corresponding DUT.

18 Claims, 2 Drawing Sheets

(56) References Cited

U.S. PATENT DOCUMENTS

| | | | |
|---|---|---|---|
| 2007/0091814 A1* | 4/2007 | Leung | H04L 1/243 370/252 |
| 2007/0291684 A1* | 12/2007 | Lee | H04B 1/71632 370/328 |
| 2011/0044218 A1 | 2/2011 | Kaur et al. | |
| 2011/0069624 A1* | 3/2011 | Olgaard | H04L 12/56 370/252 |
| 2011/0075605 A1 | 3/2011 | De Pasquale et al. | |
| 2012/0108241 A1 | 5/2012 | Wu | |
| 2012/0121000 A1 | 5/2012 | Olgaard et al. | |
| 2012/0213112 A1* | 8/2012 | Olgaard | H04L 12/2697 370/252 |
| 2013/0266051 A1* | 10/2013 | Yang | H04B 17/008 375/224 |
| 2013/0266052 A1 | 10/2013 | Yang et al. | |
| 2013/0294255 A1* | 11/2013 | Olgaard | H04W 48/06 370/242 |
| 2014/0169181 A1* | 6/2014 | Olgaard | H04W 24/06 370/242 |
| 2014/0208082 A1* | 7/2014 | Fritzsche | G06F 11/2294 712/227 |

FOREIGN PATENT DOCUMENTS

| | | |
|---|---|---|
| WO | 2010074814 A2 | 7/2010 |
| WO | 2010-117698 A2 | 10/2010 |
| WO | 2011034923 A2 | 3/2011 |

OTHER PUBLICATIONS

U.S. Appl. No. 13/595,556, "System and Method for Testing Radio Frequency Device Under Test Capable of Communicating Using Multiple Radio Access Technologies".

International Search Report and Written Opinion Dated Aug. 27, 2013 for Application No. PCT/US2013/043850.

* cited by examiner

SYSTEM AND METHOD FOR CONCURRENTLY TESTING MULTIPLE PACKET DATA SIGNAL TRANSCEIVERS CAPABLE OF COMMUNICATING VIA MULTIPLE RADIO ACCESS TECHNOLOGIES

BACKGROUND

The present invention relates to testing packet data signal transceiver devices under test (DUTs), and in particular, to using a shared packet data signal source to test multiple DUTs capable of communicating using multiple radio access technologies (RATs).

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such wireless devices, engineers take extra care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems employ a subsystem for analyzing signals received from each device. Such subsystems typically include at least a vector signal generator (VSG) for providing the source signals to be transmitted to the device under test, and a vector signal analyzer (VSA) for analyzing signals produced by the device under test. The production of test signals by the VSG and signal analysis performed by the VSA are generally programmable so as to allow each to be used for testing a variety of devices for adherence to a variety of wireless technology standards with differing frequency ranges, bandwidths and signal modulation characteristics.

As part of the manufacturing of wireless communication devices, one significant component of production cost is costs associated with manufacturing tests, particularly with many such devices being manufactured at the rate of millions of devices per month. Typically, there is a direct correlation between the cost of test and the sophistication of the test equipment required to perform the test. Hence, innovations that can preserve test accuracy while minimizing equipment costs (e.g., due to rising costs of increasingly sophisticated test equipment, or testers) are important and can provide significant costs savings.

Testing of such wireless DUTs can be done faster by testing multiple DUTs concurrently. One technique includes using multiple test systems, or testers, with each one connected to its own DUT and operating essentially in parallel. Another technique includes sharing test equipment resources in such a way that multiple DUTs, following initialization and synchronization, receive a sequence of replicated test waveforms. This technique can be used where the DUTs are all receiving the same waveforms and are testing the same radio access technology (RAT). In those cases where the multiple DUTs are being tested for different RATs, and the download (DL) test packets have different characteristics (e.g., bit content, packet length, packet duration, etc.), a test waveform generator (e.g., a VSG) can only source one waveform at a time for a particular RAT test. As the DUTs being tested for different RATs are switched or multiplexed to receive the signal from the single test waveform generator, test continuity and integrity will be lost unless operation of each DUT is appropriately synchronized with the test waveform it is to receive. Therefore, concurrent DUT testing has been limited to cases where multiple DUTs are all being tested for the same RAT.

Accordingly, it would be desirable to have a technique for concurrent testing of increasingly sophisticated DUTs with increasingly varied performance characteristics and requirements without also requiring increasingly sophisticated testers with similarly increasingly varied testing characteristics and requirements.

SUMMARY

In accordance with the presently claimed invention, a system and method are provided for using a shared packet data signal source to test multiple packet data signal transceiver devices under test (DUTs) capable of communicating using multiple radio access technologies (RATs). The signal source provides a packet data signal that includes a plurality of sequential signal segments having respective signal timing parameters and mutually distinct signal characteristics in accordance with the RATs. Based upon the signal timing parameters, at least a portion of each signal segment is routed to a respective one of multiple signal connections for conveyance to a corresponding DUT.

In accordance with one embodiment of the presently claimed invention, a system for testing a plurality of packet data signal transceiver devices under test (DUTs) capable of communicating using a plurality of radio access technologies (RATs) includes: a plurality of signal connections to convey at least respective portions of a packet data signal to respective ones of a plurality of DUTs; a packet data signal source to provide the packet data signal, wherein the packet data signal includes a plurality of sequential signal segments having respective signal timing parameters including at least segment timing boundaries separating adjacent signal segments, and having mutually distinct signal characteristics in accordance with a plurality of RATs; signal routing circuitry coupled between the packet data signal source and the plurality of signal connections, and responsive to at least one or more routing control signals by routing at least a portion of each one of at least a portion of the plurality of sequential signal segments to a respective one of the plurality of signal connections; and control circuitry coupled to the signal routing circuitry to provide the one or more routing control signals. In accordance with the one or more routing control signals: at least a portion of a first one of the plurality of sequential signal segments is routed to a first one of the plurality of signal connections during a first time interval related to a first one of the respective signal timing parameters; and at least a portion of a second one of the plurality of sequential signal segments is routed to a second one of the plurality of signal connections during a second time interval related to a second one of the respective signal timing parameters.

In accordance with another embodiment of the presently claimed invention, a method of testing a plurality of packet data signal transceiver devices under test (DUTs) capable of communicating using a plurality of radio access technologies (RATs) includes: generating a packet data signal that includes a plurality of sequential signal segments having respective signal timing parameters including at least segment timing boundaries separating adjacent signal segments, and having mutually distinct signal characteristics in accordance with a plurality of RATs; responding to at least one or more routing control signals by routing at least a portion of each one of at least a portion of the plurality of sequential signal segments to a respective one of a plurality of DUTs; and generating the one or more routing control signals. In accordance with the one or more routing control signals: at least a portion of a first one of the plurality of sequential signal segments is routed to a first one of the plurality of DUTs during a first time interval related to a first one of the respective signal timing parameters; and at least a portion of a second one of the plurality of sequential signal segments is routed to a second one of the plurality of DUTs during a second time interval related to a second one of the respective signal timing parameters.

DETAILED DESCRIPTION

Figure 1:
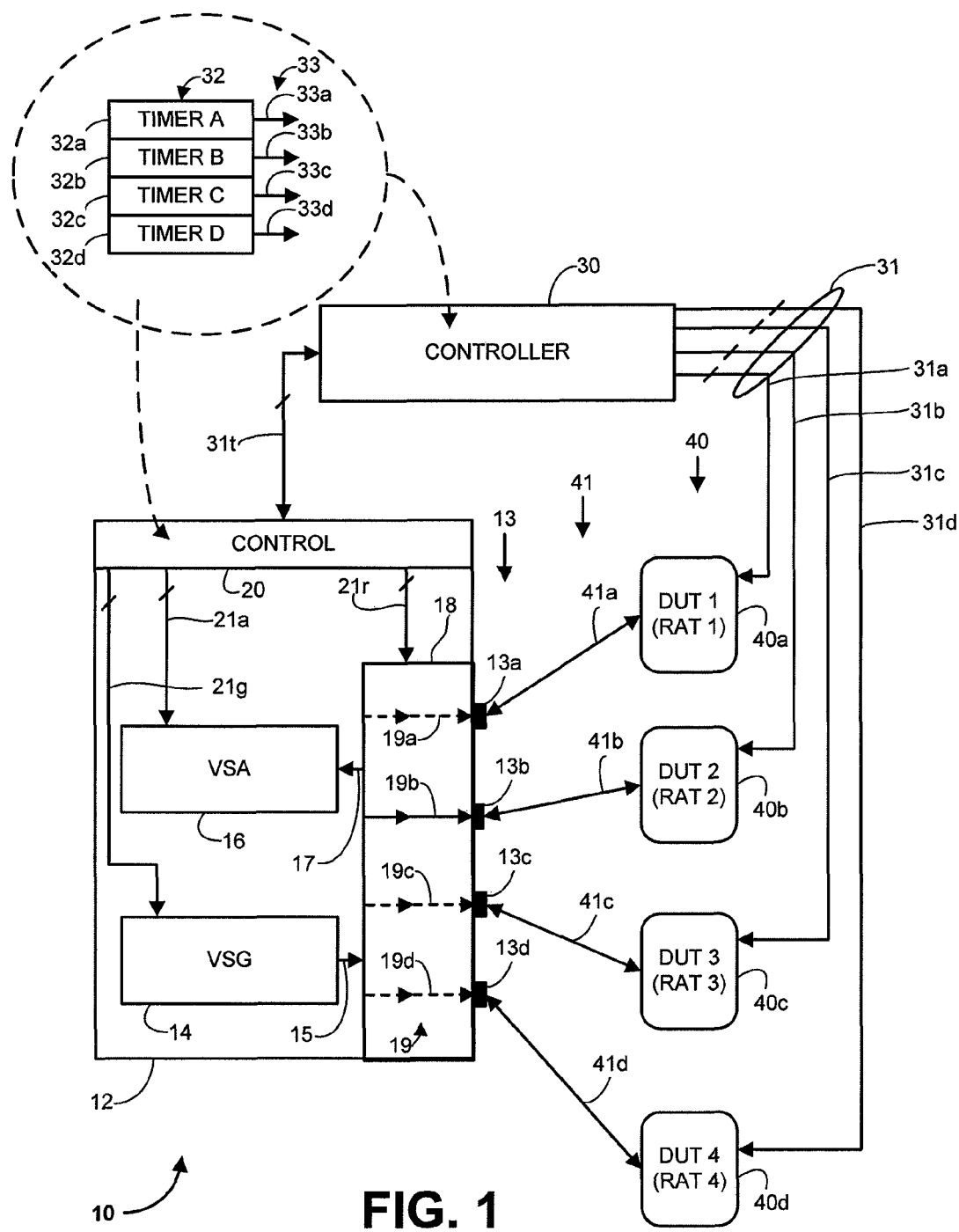
FIG. 1 depicts a testing environment for testing multiple DUTs in accordance with exemplary embodiments of the presently claimed invention.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

As discussed in more detail below, in accordance with the presently claimed invention, multiple DUTs capable of communicating via multiple RATs can be tested concurrently using a single, shared packet data signal source. In accordance with the presently claimed invention, synchronization among the shared signal source and multiple DUTs is managed and preserved even as the shared signal source provides packet data signals to the multiple DUTs with multiple wave forms conforming to multiple RAT tests.

More particularly, synchronization of the shared wave form signal generator with multiple DUTs is managed as the shared signal generator sequentially engages with and conveys to the DUTs different download (DL) test packets consistent with the different RAT tests. In accordance with exemplary embodiments, individual timers associated with the different DL test packets are used to initiate and coordinate switching among or multiplexing at sequential packet data signal segments of the radio frequency (RF) packet data signal provided by the shared generator in accordance with the different DL test packets corresponding to the different RAT tests to be performed. Timing signals provided by these timers coordinate the generating of the signal segments in accordance with the DL test packets, as well as the switching or multiplexing of such signal segments to the appropriate DUT, thereby maintaining continuity and integrity of the test.

In accordance with well-known principles, the RATs are distinct from one another and have one or more different signal characteristics, including signal frequency, packet data bit rate, signal modulation type, data packet duration, etc. Accordingly, the DL data packets associated with each RAT will also have different characteristics, including different bit content and duration. Further, due to these differing signal characteristics, each set of DL data packets will have different signal timing parameters reflective of such different data packet contents, duration, etc.

Referring to FIG. 1, in accordance with exemplary embodiments, a testing environment includes a tester 12 and external controller 30 and multiple DUTs 40, interconnected substantially as shown. As depicted here and for purposes of the following discussion, four DUTs 40a, 40b, 40c, 40d are described as being tested concurrently. However, as will be readily recognized by one of ordinary skill in the art, the number of DUTs that can be tested in accordance with the presently claimed invention can be scaled up or down, as desired.

The tester 12 includes a signal source 14 (e.g., a VSG), a signal receiver 16 (e.g., a VSA), signal routing circuitry 18 (e.g., signal switching or multiplexing circuitry) and control circuitry 20 (e.g., internal to the tester 12 or, if external, otherwise associated and in communication with the tester 12). The signal source 14 provides the RF packet data signal 15 having multiple signal segments in accordance with different RATs (discussed in more detail below) to be shared among the multiple DUTs 40. This signal 15, generated by the signal source 14 in accordance with one or more control signals 21g from the control circuitry 20, is conveyed by the routing circuitry 18 in accordance with one or more control signals 21r from the control circuitry 20. For example, as depicted here, the second signal path 19b of the multiple signal paths 19 provided by the routing circuitry 18 is enabled so as to convey the source signal 15 to the second DUT 40b.

During transmit signal testing of the DUTs 40, the signal receiver 16 receives a switched or multiplexed signal 17 from one of the DUTs 40 for reception and analysis in accordance with one or more control signals 21a from the control circuitry 20.

The tester 12 further includes multiple (e.g., four in this example) RF signal connections 13 via which the switched or multiplexed packet data signals are conveyed, typically by way of conductive signal paths 41 in the form of coaxial RF signal cables and connectors.

The external controller 30 (e.g., a personal computer programmed with appropriate test control software) provides one or more control signals 31t for controlling the tester 12, and one or more additional control signals 31 for the DUTs 40. For example, each DUT 40a, 40b, 40c, 40d is controlled by one or more respective control signals 31a, 31b, 31c, 31d to operate in accordance with a different RAT.

In accordance with exemplary embodiments, multiple timers 32 (e.g., individual timer circuits or software timers) are used to provide timing control data or signals 33 to coordinate and maintain synchronization of the tester 12 (e.g., the shared signal source 14 and routing circuitry 18) and the DUTs 40. For example, for this example using four DUTs 40, four timers 32a, 32b, 32c, 32d are used to provide four timing signals 33a, 33b, 33c, 33d to initiate and maintain synchronization of the signal source 14, multiple DUTs 40 and conveyance of the shared source signal 15 to the DUTs 40 via the signal routing circuitry 18. As will be readily understood by one of ordinary skill in the art, these timing signals 33a, 33b, 33c, 33d are incorporated into and conveyed via or are otherwise used to produce the control signals 21g, 21r, 31 to the signal source 14, routing circuitry 18 and DUTs 40.

As will be further readily understood, the timers 32 can be incorporated within the control circuitry 20 associated with the tester 12, or within the external controller 30. For example, if included within the tester control circuitry 20, timing information is available directly for use as part of or to otherwise produce the internal control signals 21g, 21r for the signal source 14 and routing circuitry 18, and can be made available for use as part of or to otherwise produce the DUT control signals 31 via the external control signal interface 31t and controller 30. Similarly, if included as part of the external controller 30, the timing information is available for direct use as part of or to otherwise produce the DUT control signals 31 and can be made available for use as part of or to otherwise produce the internal tester control signals 21g, 21r via the external control signal interface 31t and internal control circuitry 20.

Figure 2:
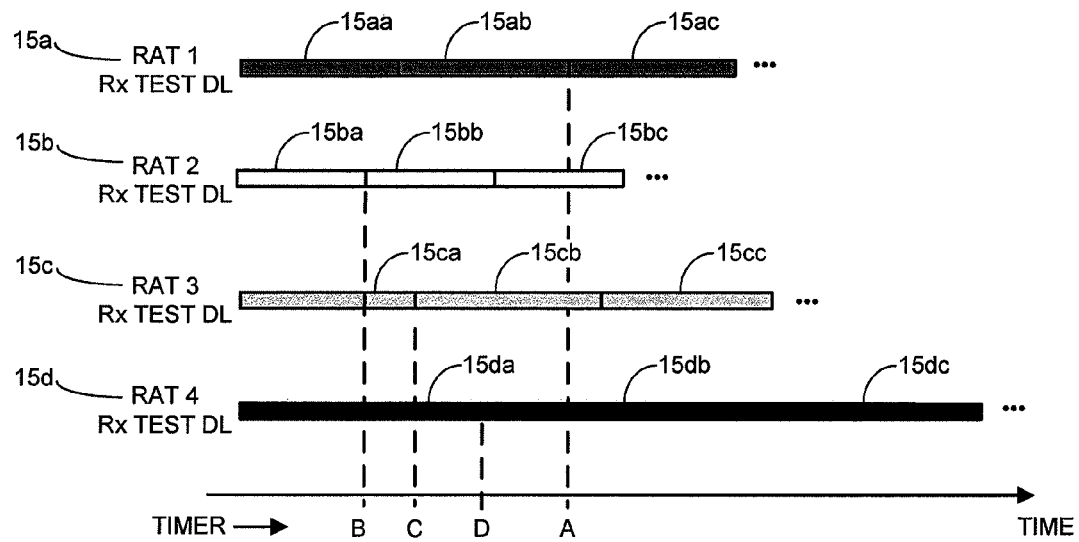
FIG. 2 depicts signal segments provided by a shared test signal source when testing multiple DUTs in accordance with exemplary embodiments of the presently claimed invention.

Referring to FIG. 2, the packet data signal segments to be provided as part of the shared source signal 15 can be better understood. As discussed above, this exemplary embodiment involves testing of four DUTs 40 operating in accordance with four RATs. Hence, four sets of signal segments 15a, 15b, 15c, 15d are generated by the signal source 14 to be selected for conveyance to the appropriate DUT 40a, 40b, 40c, 40d in accordance with timing information provided by the four timers 32a (A), 32b (B), 32c (C), 32d (D). For example, in accordance with expirations of timers B, C, D and A, the RF packet data signal 15 will include packet data signal segments 15ba, 15cb, 15db and 15ac, respectively, for testing the second 40b, third 40c, fourth 40d and first 40a DUTs, respectively, in accordance with the second, third, fourth and first RAT, respectively.

Figure 3:
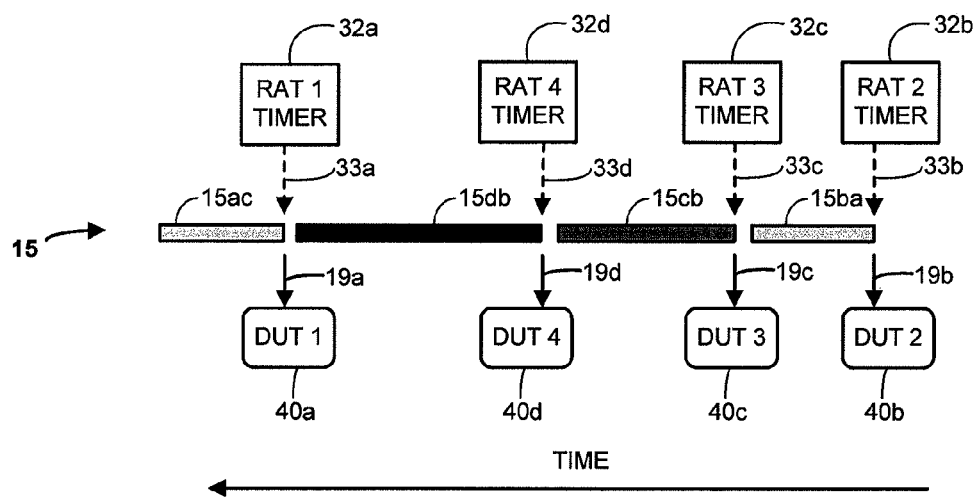
FIG. 3 depicts an exemplary timing relationship of signal segments provided for testing multiple DUTs in accordance with exemplary embodiments of the presently claimed invention.

Referring to FIG. 3, as discussed above, the signal source 14 provides the shared packet data signal 15. In accordance with the timing information 33a, 33b, 33c, 33d provided by the timers 32a, 32b, 32c, 32d, different packet data signal segments 15ba, 15cb, 15db, 15ac are provided to designated DUTs 40b, 40c, 40d, 40a via corresponding signal paths 19b, 19c, 19d, 19a of the signal routing circuitry 18. (As will be readily appreciated by one of ordinary skill in the art, other sequences of packet data signal segments can be conveyed to other sequences of DUTs in accordance with various packet data signal characteristics, such as packet data signal segment duration, number of packet data signal segments necessary for a particular test, and so on.)

As depicted here for purposes of this example, switching among or multiplexing of the various packet data signal segments 15a, 15b, 15c, 15d is depicted as occurring at, or otherwise based upon, the signal segment timing boundaries, i.e., the boundary between adjacent packet data signal segments. However, it will be readily appreciated that other signal timing parameters can be used to initiate switching between or multiplexing of the packet data signal segments. For example, other timing parameters associated with the various bit patterns or data packet contents can be used to initiate or otherwise coordinate the switching or multiplexing of the various packet data signal segments. Further, in accordance with necessary or desired testing conditions, each packet data signal segment can include a single data packet, multiple data packets, or portions of data packets.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system for testing a plurality of radio frequency (RF) packet data signal transceiver devices under test (DUTs) capable of communicating using a plurality of radio access technologies (RATs), comprising:
   a plurality of signal connections to convey at least respective portions of a packet data signal to respective ones of a plurality of DUTs;
   a packet data signal source to provide said packet data signal, wherein said packet data signal includes a plurality of sequential signal segments having respective signal timing parameters including at least segment timing boundaries separating adjacent signal segments, and having mutually distinct signal characteristics in accordance with a plurality of RATs;
   signal routing circuitry coupled between said packet data signal source and said plurality of signal connections, and responsive to at least one or more routing control signals by routing at least one of said plurality of sequential signal segments to a respective one of said plurality of signal connections; and
   control circuitry coupled to said signal routing circuitry to provide said one or more routing control signals in accordance with which
      at least a portion of a first one of said plurality of sequential signal segments is routed to a first one of said plurality of signal connections during a first time interval related to a first one of said respective signal timing parameters, and
      at least a portion of a second one of said plurality of sequential signal segments is routed to a second one of said plurality of signal connections during a second time interval related to a second one of said respective signal timing parameters.

2. The apparatus of claim 1, wherein said first one of said respective signal timing parameters corresponds to said first one of said plurality of sequential signal segments, and said second one of said respective signal timing parameters corresponds to said second one of said plurality of sequential signal segments.

3. The apparatus of claim 1, wherein said packet data signal source is responsive to at least one or more source control signals by providing said packet data signal.

4. The apparatus of claim 3, wherein said one or more routing control signals are related to said one or more source control signals.

5. The apparatus of claim 3, wherein said control circuitry is further coupled to said packet data signal source to provide said one or more source control signals.

6. The apparatus of claim 3, wherein said control circuitry comprises timer circuitry to provide a plurality of timing signals related to said one or more source control signals and said one or more routing control signals.

7. The apparatus of claim 1, wherein said packet data signal source comprises a vector signal generator.

8. The apparatus of claim 1, wherein said signal routing circuitry comprises signal switching circuitry.

9. The apparatus of claim 1, wherein said signal routing circuitry comprises signal multiplexing circuitry.

10. A method of testing a plurality of radio frequency (RF) packet data signal transceiver devices under test (DUTs) capable of communicating using a plurality of radio access technologies (RATs), comprising:

generating a packet data signal that includes a plurality of sequential signal segments having respective signal timing parameters including at least segment timing boundaries separating adjacent signal segments, and having mutually distinct signal characteristics in accordance with a plurality of RATs;

responding to at least one or more routing control signals by routing at least one of said plurality of sequential signal segments to a respective one of a plurality of DUTs; and generating said one or more routing control signals in accordance with which at least a portion of a first one of said plurality of sequential signal segments is routed to a first one of said plurality of DUTs during a first time interval related to a first one of said respective signal timing parameters, and at least a portion of a second one of said plurality of sequential signal segments is routed to a second one of said plurality of DUTs during a second time interval related to a second one of said respective signal timing parameters.

11. The method of claim 10, wherein said first one of said respective signal timing parameters corresponds to said first one of said plurality of sequential signal segments, and said second one of said respective signal timing parameters corresponds to said second one of said plurality of sequential signal segments.

12. The method of claim 10, wherein said generating a packet data signal comprises responding to at least one or more source control signals by generating said packet data signal.

13. The method of claim 12, wherein said one or more routing control signals are related to said one or more source control signals.

14. The method of claim 12, further comprising generating said one or more source control signals.

15. The method of claim 12, further comprising generating a plurality of timing signals related to said one or more source control signals and said one or more routing control signals.

16. The method of claim 10, wherein said generating a packet data signal comprises generating said packet data signal with a vector signal generator.

17. The method of claim 10, wherein said routing at least one of said plurality of sequential signal segments comprises switching said plurality of sequential signal segments.

18. The method of claim 10, wherein said routing at least one of said plurality of sequential signal segments comprises multiplexing said plurality of sequential signal segments.

* * * * *